(12) United States Patent
Jacobs et al.

(10) Patent No.: US 8,358,499 B2
(45) Date of Patent: Jan. 22, 2013

(54) DATA STORAGE MODULE COMPRISING MULTIPLE STORAGE MEDIUM COMPONENTS

(75) Inventors: Jordan S. Jacobs, Orlando, FL (US);
Joseph A. Hock, Orlando, FL (US);
Anthony L. Awtrey, Orlando, FL (US)

(73) Assignee: I.D.E.A.L. Technology Corporation, Orlando, FL (US)

( * ) Notice: Subject to any disclaimer, the term of this patent is extended or adjusted under 35 U.S.C. 154(b) by 610 days.

(21) Appl. No.: 12/577,559

(22) Filed: Oct. 12, 2009

(65) Prior Publication Data

US 2011/0085294 A1  Apr. 14, 2011

(51) Int. Cl.
*H05K 5/00* (2006.01)
*H05K 7/00* (2006.01)
(52) U.S. Cl. .............................. 361/679.33; 361/679.01

(58) Field of Classification Search ............. 361/679.01, 361/679.33
See application file for complete search history.

(56) References Cited

U.S. PATENT DOCUMENTS

| | | | |
|---|---|---|---|
| 5,513,069 A * | 4/1996 | Ohgami et al. | 361/679.39 |
| 6,918,174 B2 * | 7/2005 | Kim et al. | 29/603.04 |
| 2007/0214331 A1 | 9/2007 | Murphy | |

* cited by examiner

*Primary Examiner* — Anthony Haughton
(74) *Attorney, Agent, or Firm* — Timothy H. Van Dyke; Beusse, Wolter, Sanks, Mora & Maire, P.A.

(57) ABSTRACT

Disclosed herein is a data storage module for use with and insertion into a bay of a computer. The module may comprise a casing that has a first end and a second end. The module also includes two or more storage medium components contained within said casing, wherein said two or more storage medium components are physically isolated from each other. This enables the provision of two separate storage medium components with different operating systems or user information and/or data to be provided on a single hardware module.

30 Claims, 3 Drawing Sheets

DATA STORAGE MODULE COMPRISING MULTIPLE STORAGE MEDIUM COMPONENTS

BACKGROUND

A hard drive, also known as a hard disk or hard disk drive (HDD), is a non-volatile data storage device for a computer. The conventional hard drive is typically a simple, tightly sealed aluminum box that has a filtered air-vent. Inside the box of a conventional hard drive are electronics that direct the read/write head or heads held aloft by a spindle arm and control the motor which rotates magnetic medium platters ("hard disks"). The hard drive's driver electronics contain the instructions for recording data onto the hard disks and for translating magnetic patterns into bytes when data is requested by the CPU. The interfacing of a HDD with a computer, as well as basic operation and functionality of HDDs, has not changed much over the last twenty years. The inventors have developed, as described herein, a number of structural changes regarding the bundling, configuration and accessibility of hard drives that enable increased functionality for the user.

SUMMARY

In one embodiment, the invention pertains to a self contained data storage module for use with a computer. The module comprises a casing that has a first end and a second end. The module also includes two or more storage medium components contained within said casing, wherein the two or more storage medium components are physically isolated from each other. This enables the provision of two separate HDDs with different operating systems or user information and/or data to be provided within a single hardware module.

In a specific embodiment, the data storage module includes a first storage medium component including a first operating system loaded thereon and a second storage medium component comprising a second operating system loaded thereon. In a further example, the first operating system is MICROSOFT WINDOWS® and the second operating system is Linux. Naturally, in view of the teachings herein, those skilled in the art will readily appreciate that the first and second operating systems may include, but not be limited to, the same type of operating system or a number of different operating systems, including those other than MICROSOFT WINDOWS® or Linux. This allows the user to utilize one loaded operating system for one purpose, such as personal use, and another loaded operating system for work use. This, in turn, enables the facile use of two different and physically isolated operating systems. Other uses would include a classified operating system such as for military or police use, and another loaded operating system for non-classified use. The invention is valuable to standard computer users, but, as will be apparent by those skilled in the art, is particularly useful for security personnel, police, military and intelligence use, as well as other governmental uses.

In an alternative embodiment, two or more storage medium components comprise the same operating system loaded thereon. One load is controlled and remains "clean", while the other load is available for testing purposes.

DETAILED DESCRIPTION

Figure 1:
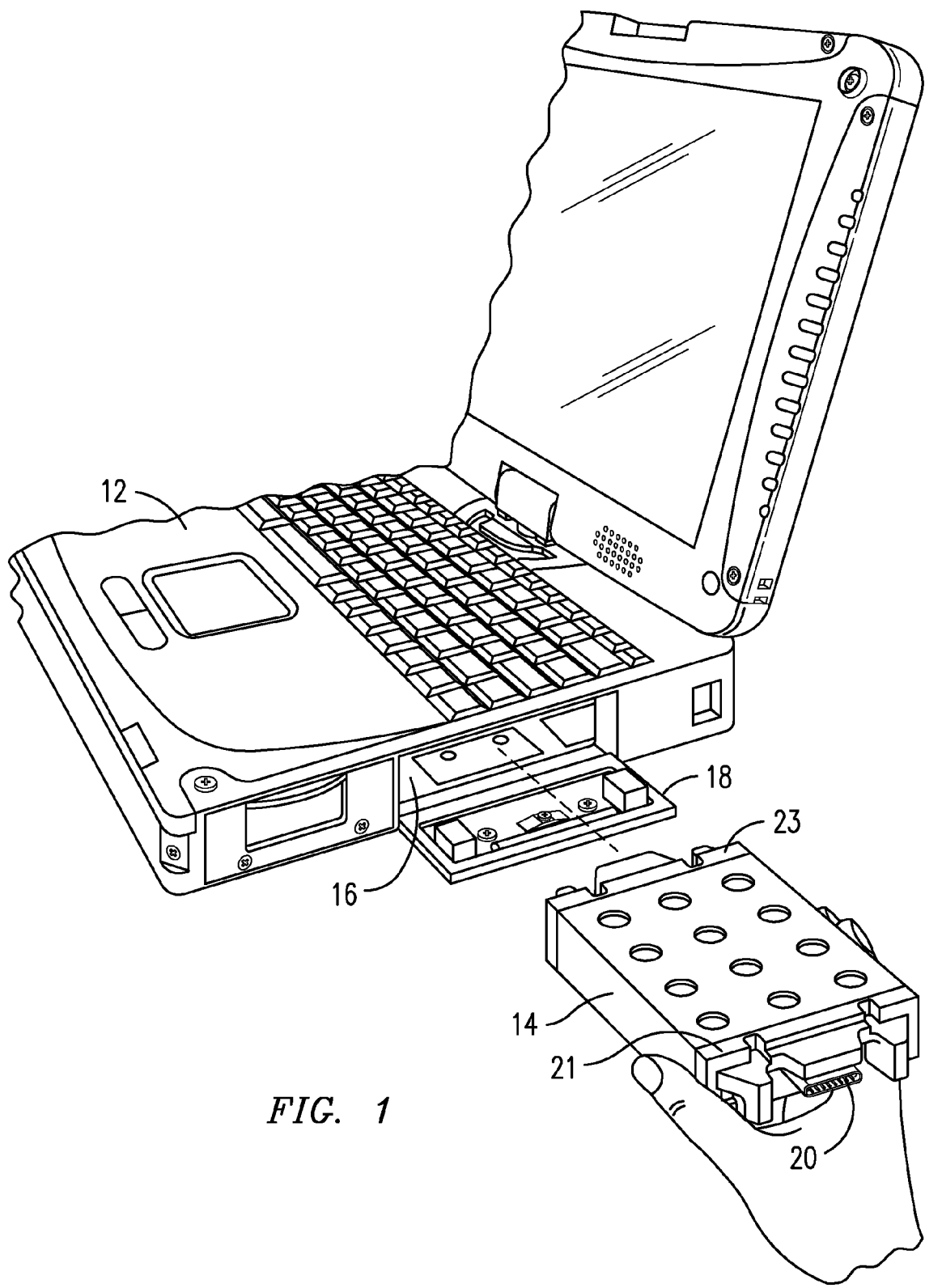
FIG. 1 shows a side perspective view of a computer with a data storage module embodiment designed for use therewith.

Turning to FIG. 1, a side perspective view of an embodiment is shown relating to a removable data storage module 14 having a first end 21 and a second end 23. The data storage module 14 is removable from a drive bay 16 configured within a computer 12 (e.g., PANASONIC TOUGHBOOK®). An optional bay door 18 is also shown in FIG. 1 for protecting the bay 16. The data storage module 14 has a first computer jack 20 disposed on the first end 21. A second computer jack (not shown) is provided on the second end 23. The second computer jack may be a similar or different computer jack. The data storage module comprises at least two storage medium components. Those skilled in the art will appreciate that the data module 14 may comprise two storage medium components or several storage medium components. Depending on the desired purpose by the user, the data storage module 14 is removed from the drive bay 16, turned and reinserted into the drive bay 16. The data storage module may, for example, pertain to a hard disk drive, optical drive, solid state drive and the like suitable for storing data. The data storage module may comprise (such as either on the storage medium component(s) or as part of firmware associated with the data storage module) computer program code modules for performing various desired functions. Such functionality may include zeroizing data and securing data as will be discussed in further detail below. In a specific embodiment, the data storage module comprises at least one operating system for carrying out operation of the computer 12. Moreover, the data storage module may comprise operating system loads on each of the storage medium components, where the operating system loads are of the same type or are different. Even further, each of the storage medium components may include two or more operating systems loaded thereon, such as by, but not limited to, partitioning of a storage medium component for "dual boot" operation of each operating system.

The term "data storage module" as used herein refers to a self encased device that comprises two or more physically separate storage medium components (e.g., HDD or other non-volatile media).

The term "externally accessible" in reference to a bay of a computer means that the bay is designed to be a receptacle into which a data storage module is inserted with the bay being accessible from outside the computer. The bay includes a receiver jack that is configured to mate with a jack on the data storage module. As used herein, the term 'jack' is intended to refer to a means of connecting the data storage module to the computer. 'Jack' may pertain to a receiver for receiving a plug, or a plug for insertion into a receiver, or even a jack design that comprises both receiver and plug elements. Jacks used in certain embodiments of the invention incorporate one or more conductive components such that electrical signals may be transferred from one jack to another. In a specific embodiment, the receiver jack and the data storage module jack may implement a host bus adapter (HBA). In computer hardware, a host controller, host adapter, or HBA connects a host system (the computer) to other network and storage devices. The terms are primarily used to refer to devices for connecting SCSI, Fibre Channel and eSATA devices, but devices for connecting to IDE, Ethernet, FireWire, USB and other systems may also be called host adapters. Examples of jacks that may be used in connection with certain data storage module embodiments as taught herein include, but are not limited to, a HBA such as integrated drive electronics (IDE)/ATA/ATAPI, SCSI, serial-attached SCSI (SAS), or serial ATA (SATA), or universal serial bus (USB) adapter, IEEE-1394 (FireWire), PCMCIA, iSCSI, CompactFlash, expresscard, eSATA, fiber channel or other HBAs for connecting a host system (e.g., computer) to a storage device. In a specific embodiment, the data storage module is supported by one or more inner walls of the bay. In a more specific embodiment, at least a portion of the data storage module including a jack associated therewith is contained within the bay. In an even more specific embodiment, at least 10-100 percent, 25-100 percent, 50-100 percent, 75-100 percent or 90-100 percent (and all percent integers within such range) of the data storage module is contained within the bay. In an even more specific embodiment, at least ten percent, fifteen percent, twenty percent, twenty-five percent, thirty percent, thirty-five percent, forty percent, forty-five percent, fifty percent, fifty-five percent, sixty percent, sixty-five percent, seventy percent, seventy-five percent, eighty percent, eighty-five percent, or ninety percent or higher percent of the surface area of the data storage module is contained within the bay. The bay may be designed such that a data storage module is user-removable, i.e., easily and readily removable by hand without the need for a tool such as a screw driver, hex tool and the like.

The term "physically separate" or "physically separated" as used in reference to storage medium components means that the storage medium components cannot communicate information to each other, i.e., they are not communicatingly connected. In some embodiments where only one jack is provided on the data storage module, physical separation is achieved by one or more switches (i.e., mechanism capable of allowing or preventing electrical connectivity between the storage medium component and the computer), whereby when one storage medium component is able to communicate with a computer, the physically separated storage medium component cannot. In another embodiment, the data storage module comprises two or more jacks, wherein a first jack is communicatingly connected with a first storage medium component and a second jack is communicatingly connected with a second storage medium component. The wiring between the jack and the storage medium component is such that the first jack cannot communicate with the second storage medium component. In an alternative embodiment, the data storage module may include only one jack but wherein one orientation the jack communicates with a first storage medium component, and in a second orientation, such as turning the data storage module over, the jack communicates with a second storage medium component.

As used herein, a "computer appliance," or "appliance," refers to an embedded system device that provides a narrow range of functions, and generally uses a dedicated hardware platform. An embedded system is a special-purpose computer system designed to perform one or a few dedicated functions, often with real-time computing constraints. It is usually embedded as part of a complete device including hardware and mechanical parts. In contrast, a general-purpose computer, such as a personal computer, can do many different tasks depending on programming. Since the embedded system is dedicated to specific tasks, design engineers can optimize it, reducing the size and cost of the product, or increasing the reliability and performance. Some embedded systems are mass-produced, benefiting from economies of scale. In general, "embedded system" is not an exactly defined term, as many systems have some element of programmability. For example, handheld computers share some elements with embedded systems—such as the operating systems and microprocessors which power them—but are not truly embedded systems, because they allow different applications to be loaded.

As will be appreciated by one of skill in the art, certain examples of the present invention may be embodied as a device or system comprising a processing module, and/or computer program product comprising at least one program code module. Accordingly, the present invention may take the form of an entirely hardware embodiment or an embodiment combining software and hardware aspects, commonly known as firmware. As used herein, firmware comprises a computer program module that is embedded in a hardware device, for example a microcontroller. It can also be provided on flash memory or as a binary image file that can be uploaded onto existing hardware by a user. As its name suggests, firmware is somewhere between hardware and software. Like software, it is a computer program which is executed by a microprocessor or a microcontroller, but it is also tightly linked to a piece of hardware, and has little meaning outside of it.

The term "processing module" may include a single processing device or a plurality of processing devices. Such a processing device may be a microprocessor, microcontroller, digital signal processor, microcomputer, central processing unit (CPU), field programmable gate array (FPGA), programmable logic device, state machine, logic circuitry, analog circuitry, digital circuitry, and/or any device that manipulates signals (analog and/or digital) based on operational instructions. The processing module may have operationally coupled thereto, or integrated therewith, a memory device. The memory device may be a single memory device or a plurality of memory devices. Such a memory device may be a read-only memory, random access memory, volatile memory, non-volatile memory, static memory, dynamic memory, flash memory, and/or any device that stores digital information. A computer, as used herein, is a device that comprises at least one processing module, and optionally at least one memory device.

The data storage modules may include a storage medium component(s) such as, but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a random access memory (RAM), a read-only memory (ROM), an erasable programmable read-only memory (EPROM or Flash memory), an optical fiber, a portable compact disc read-only memory (CD-ROM), a DVD (digital video disk), or other electronic storage medium.

Computer program code modules for carrying out operations of certain embodiments of the present invention may be written in an object oriented, procedural, and/or interpreted programming language including, but not limited to, Java, Smalltalk, Perl, Python, Ruby, Lisp, PHP, "C", FORTRAN, Assembly, or C++. The program code modules may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Functions of the computer as described herein can be implemented by computer-readable program code modules. These program code modules may be provided as part of firmware and/or computer-readable memory, or otherwise provided to a processing module of a general purpose computer, special purpose computer, embedded processor or other programmable data processing apparatus to produce a machine, such that the program code modules, which execute via the processing module of the computer or other programmable data processing apparatus, or as part of firmware, create means for implementing specified functions.

These computer program code modules may also be stored in a computer-readable memory that can direct a computer or other programmable data processing apparatus to function in a particular manner, such that the program code modules stored in the computer-readable memory produce an article of manufacture.

The computer program code modules may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing predetermined functions.

Figure 2:
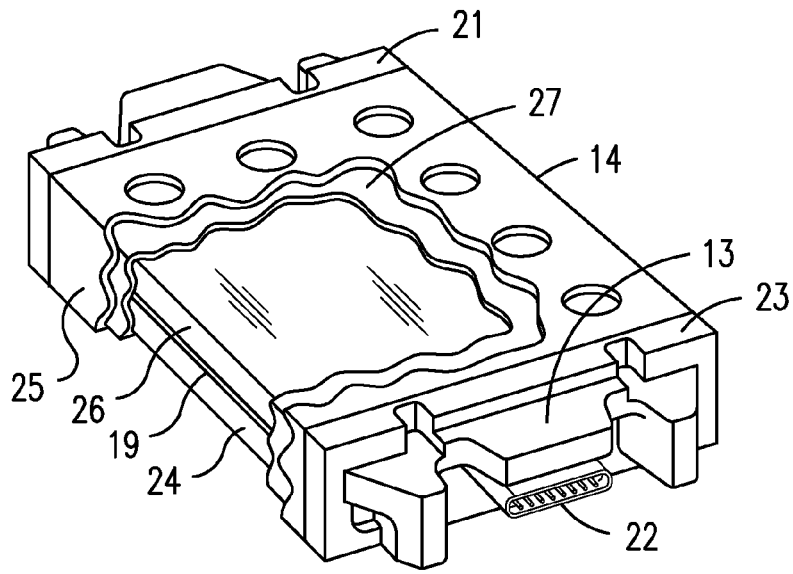
FIG. 2 shows a side, cut-away perspective view of a first embodiment of a data storage module.

FIG. 2 shows a cut-away perspective view of the data storage module 14. The second computer jack 22 is shown on end 23. The cutaway reveals that the data storage module comprises a first storage medium component 24 and a second storage medium component 26 separated by a barrier 19. Those skilled in the art would appreciate in view of the teachings herein that such barrier is optional. The first storage medium component 24 is communicatingly connected to jack 22 and the second storage medium component 26 is communicatingly connected to jack 20 on end 21 (as shown in FIG. 1, as discussed above). Typically, necessary wiring or circuitry is provided between the jacks and the respective storage medium component. The data storage module comprises an outer casing 25 and a protective layer 27 (protective layer 27 being optional) subjacent to the outer casing 25. As shown in FIG. 2, the storage medium components are stacked. Those skilled in the art will appreciate, based on the teachings herein, that other physical arrangements for the storage medium components could be made. Shown on end 23 is a support member assembly 13 that provides stabilization to the module 14 when inserted into a bay of a computer. In a preferred embodiment, the support member assembly 13 fits into a pocket (not shown) defined in the bay 16 (FIG. 1) of the computer 12 (FIG. 1).

Figure 3:
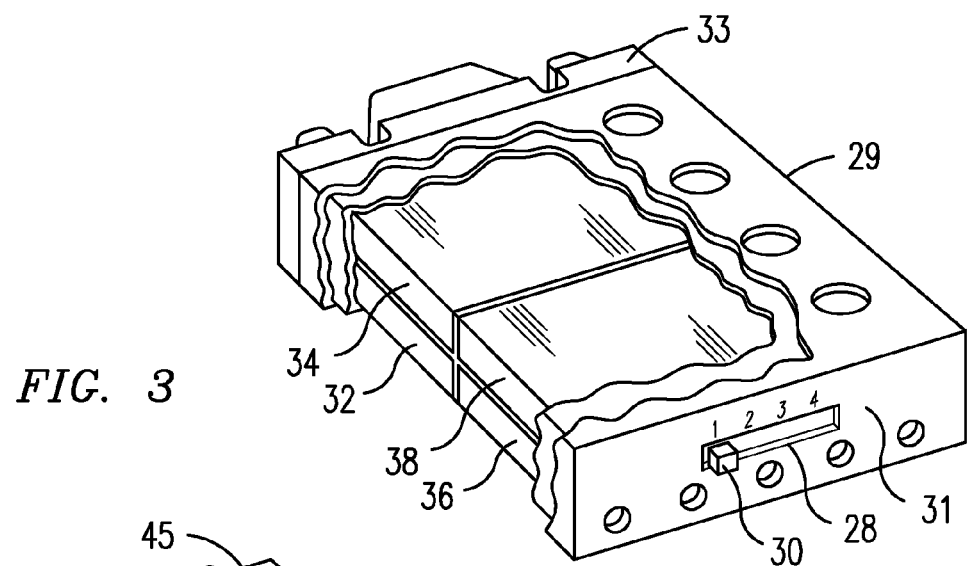
FIG. 3 shows a side, cut-away perspective view of a second embodiment of a data storage module.
Figure 6:
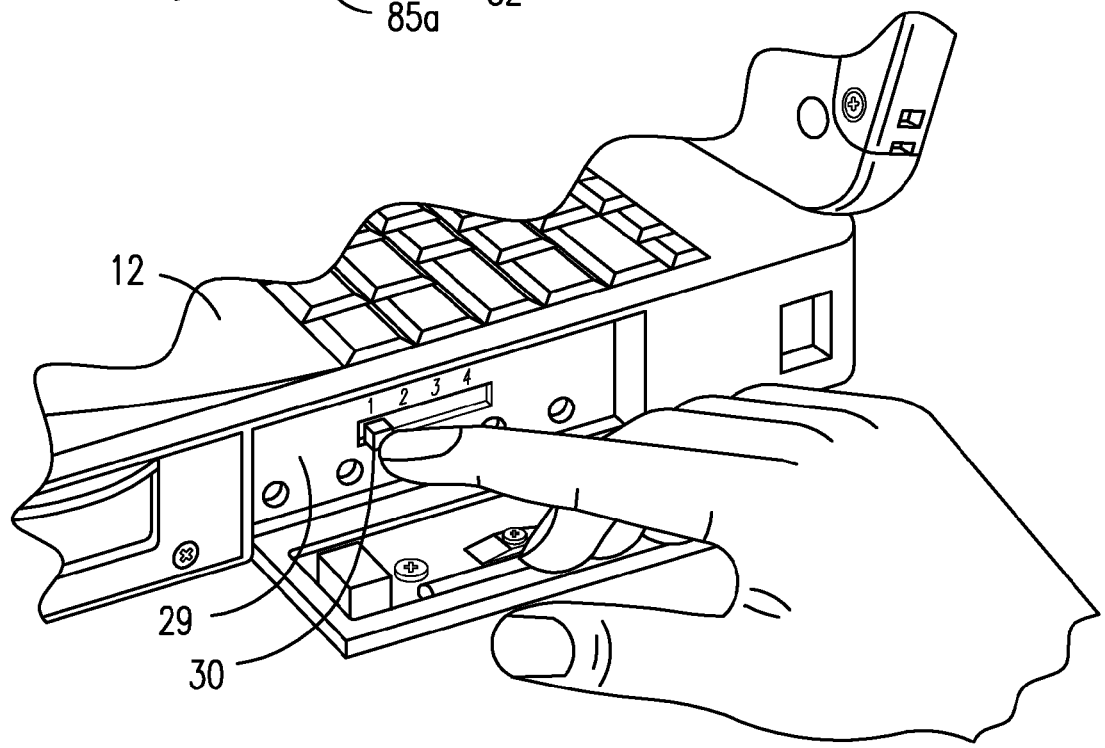
FIG. 6 shows a perspective view of an end of an alternative data storage module embodiment that includes an actuator for selecting a desired storage medium component.

FIG. 3 shows a cut-away perspective view of another data storage module 29. The cut-away shows that the module 29 includes four separate storage medium components, 32, 34, 36, and 38. Module 29 comprises one computer jack similar to 22 shown in FIG. 2 disposed on end 33. End 31 comprises a slide switch 28. Those skilled in the art will recognize in view of the teachings herein that the selector device for selecting the desired storage medium component can take one or a combination of several forms. These include, but are not limited to, a slidable switch, dial, push button, or toggle, or some other user contact responsive actuator, such as a pressure response or temperature responsive actuator. Moreover, in alternative embodiments, the selector device is sound and/or light responsive. Data storage module embodiments can be equipped to enable use of voice commands for selecting the storage medium component and/or gaining access. The actuator 30 is moved to one of four predefined positions. The actuator 30 selects the storage medium component 32, 34, 36, or 38 for usage depending on the position of the actuator 30 on the switch 28. FIG. 6 is a perspective view of the module 29 in the computer 12, showing the user selecting a desired storage medium component on the module 29 by sliding the actuator 30.

The storage medium components are typically physically isolated, that is, one storage medium component is electronically inaccessible to another. In one embodiment, one storage medium component comprises a suitable operating system (e.g., Windows, Linux, UNIX, customized operating system, etc.) for operating the computer 12 (see FIG. 1) and another storage medium component comprises a separate operating system. In a more specific example, and in reference to module 14 in FIG. 2 for exemplary purposes only, the first storage medium component 24 is loaded with Windows. When the operator wishes to operate strictly in a Windows environment, the user will connect the data storage module 14 to the computer 12 (see FIG. 1) via jack 22 (see FIG. 2). The second storage medium component 26 is loaded with Linux. When the user wishes to operate in a Linux environment, the user will connect the data storage module 14 to the computer 12 (see FIG. 1) via jack 20 (see FIG. 1). Alternatively, in reference to data storage module 29 in FIG. 3, the module 29 is connected to the computer 12 via a single jack, and the user selects the desired environment by moving actuator 30.

Figure 4:
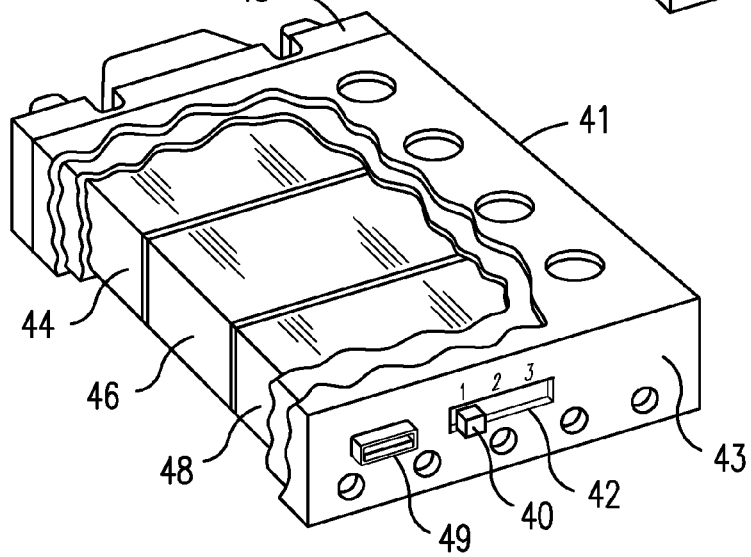
FIG. 4 shows a side, cut-away perspective view of a third embodiment of a data storage module.

FIG. 4 shows a cut-away perspective view of another data storage module 41. The cut-away shows that the module 41 includes three separate storage medium components, 44, 46, and 48. Module 41 comprises one computer jack similar to 22 shown in FIG. 2 disposed on end 45. End 43 comprises a slide switch 42. The actuator 40 is moved to one of three predefined positions. The actuator 40 selects the storage medium component 44, 46, or 48 for usage depending on the position of the actuator 40 on the switch 42. As can be seen in FIG. 4, the storage medium components 44, 46, and 48 are arranged in a row. Those skilled in the art will appreciate that other physical arrangements could be utilized.

In an alternative embodiment, with reference to data module 41 in FIG. 4, storage medium component 46 is able to communicate with both storage medium components 44 and 48. For example, storage medium component 46 may be configured without the capacity to run an operating system but rather serve as a depository for files that either storage medium component 44 or 48 can communicate with depending on which component is selected. Those skilled in the art will appreciate that the arrangement of which storage medium component serves as the depository is not limited to utilizing the middle storage medium component, in other words, the positioning of the storage medium components is not a limitation on which storage medium component serves as the depository.

Moreover, storage medium component 46 can serve as a storage medium that is externally accessible without needing to operate the computer in which the module 41 is situated. For example, as shown in FIG. 4, the data module 41 is equipped with a port 49, such as, but not limited to, a USB port, that allows connection with the module 41 for access to storage medium component 46. It is noted that storage medium component 46 may operate as a data storage means when the data module 41 is situated in an externally accessible bay of computer or when outside the bay of, and disconnected from, the computer.

Figure 5:
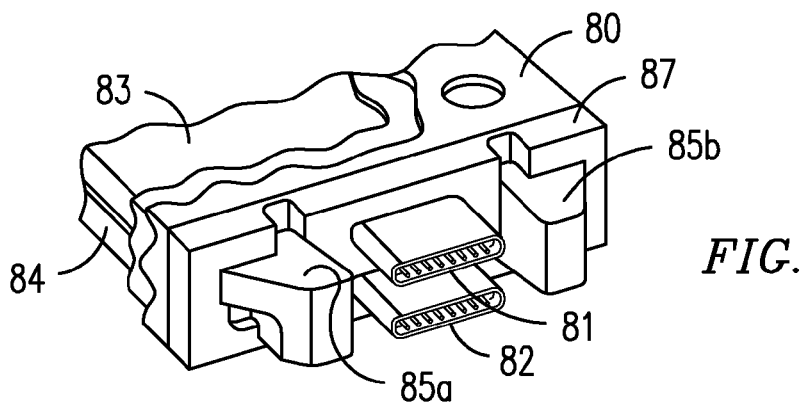
FIG. 5 shows a perspective view of an end of an alternative embodiment of a data storage module.

FIG. 5 shows an alternative embodiment of a data storage module 80 that comprises two jacks 81, 82 situated on one end 87 of the module 80. The module 80 comprises at least two storage medium components 83, 84 therein. In operation, the module 80 is inserted into a bay of a computer in order to communicatingly connect the computer to storage medium component 83 provided therein via jack 81 (or 82 depending on the circuitry). If access to data storage medium component 84 in the data storage module 80 is desired, the data storage module is flipped over and then inserted into the externally accessible bay of the computer to communicating connect the other jack 82 (or 81 depending on the circuitry). Also, shown are support members 85*a-b*, which provide stabilization to the module 80 when the module 80 is inserted into a bay of a computer. Alternatively, the bay is designed to have a receptacle to receive the lower jack, the upper jack, or both.

Figure 7:
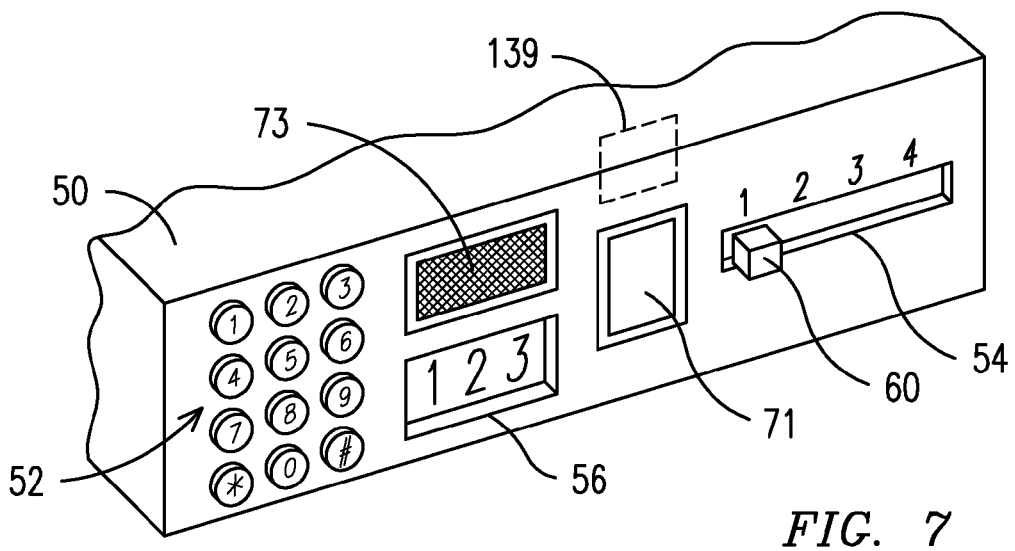
FIG. 7 shows a perspective view of an end of an alternative data storage module embodiment that includes a key-pad and other functional features.

FIG. 7 shows an alternative embodiment of a data storage module 50. The module 50 comprises a key-pad 52 and a display 56, such as an LED screen. Also, the module 50 includes a slide switch 54 with an actuator 60. The key-pad 52 allows for input of a security code to use the module 50, and/or access a given storage medium component. The key-pad 52 may also be used for selecting the desired storage medium component thereby supplanting the need for the slide switch. Furthermore, those skilled in the art will appreciate in view of the teachings herein that the user-input device for gaining access to, or selecting storage medium components of, the data storage module 50 may take any number of suitable forms, including, but not limited to, slidable combination lock, or other conventional lock interfaces, other types of push-keys or other contact responsive actuators, or even through voice commands. On this last point, the data storage module 50 further comprises a microphone module 73 into which voice commands can be entered, such as access codes or selection of storage medium components. The microphone module 73 may also include a speaker for giving auditory feedback to the user. The data storage module 50 also includes a biometric sensor 71 for allowing the functionality of the data storage module 50 to be accessed only after a positive identification of the authorized user is inputted. The biometric sensor 71 is typically a sensor for reading fingerprints, but could take the form of other sensing modalities, including, but not limited to, retinal scanning, breath sensing, biological fluid (e.g., blood) sensing, etc.

It is contemplated that the data storage module embodiments will be desirous in various military and intelligence situations. The module may comprise computer software program modules enabling the user to "zeroize" (erase) one or more of the storage medium components. This will enable the user to protect the unwanted transfer of sensitive information to unwanted persons. In reference to FIG. 7, the module 50 is configured, for example, to zeroize the storage medium components upon inputting a specific key code in the key-pad 52. In an alternative embodiment, the module may include a physical actuator that is coupled with a destruction means 139 capable of destroying the storage medium components or otherwise rendering them unreadable, or otherwise erasing information on the storage medium components. The physical actuator may be the key-pad 52, or some other actuator disposed on the module 50 similar to that described above for the selector device 60. Destruction means may include, but is not limited to, an explosive device, heat device, electronic current or magnetic device, or mechanical force applying device. Other mechanical mechanisms may be employed to protect data on the data storage module such as a physical lock that prevents the connection of the data storage module to the computer.

What is claimed is:

1. A data storage module that is insertable into and removable out of an externally accessible bay of a computer, said module comprising
 a casing comprising a first end and a second end;
 two or more storage medium components contained at least partially within said casing, wherein said two or more storage medium components are physically separated from each other;
 a selector device disposed on said first end for selecting one of said two or more storage medium components for usage; and
 at least one jack on at least one of either said first or second ends for communicatingly connecting said data storage module to said computer; wherein said casing and said at least one jack are sized and configured for positioning within said bay such that at least twenty percent of said data storage module, including said at least one jack, is contained within said bay when communicatingly connected to said computer.

2. The data storage module of claim 1, wherein said data storage module comprises a first jack disposed on said first end and a second jack disposed on said second end.

3. The data storage module of claim 1, wherein said selector device is a slidable switch, dial, push button, tilt sensor or toggle, or some other user contact responsive actuator, temperature sensor, biometric sensor, motion sensor, or light sensor.

4. The data storage module of claim 1, wherein said two or more storage medium components comprise a first storage medium component comprising a first operating system loaded thereon and a second storage medium component comprising a second operating system loaded thereon.

5. The data storage module of claim 4, wherein said first operating system and said second operating system are of a same or different type of operating system.

6. The data storage module of claim 1 comprising at least three storage medium components, said three storage medium components comprising a first storage medium component comprising a first operating system loaded thereon, a second storage medium component comprising a second operating system loaded thereon and a third storage medium component without an operating system loaded thereon, wherein said first storage medium component and said second storage medium component can communicate with said third storage medium component.

7. The data storage module of claim 1, further comprising a sound responsive actuator for selecting operation of, or gaining access to, one of said two or more storage medium components and/or gaining access to the data storage module.

8. The data storage module of claim 1, wherein said at least one jack comprises a host bus adapter (HBA).

9. The data storage module of claim 8 wherein the HBA is IDE, SCSI, SAS, SATA, PCMCIA, iSCSI, CompactFlash, expresscard, eSATA, or fiber channel.

10. The data storage module of claim 8, wherein the HBA is an USB adapter or IEEE-1394 adapter.

11. The data storage module of claim 1, further comprising a destruction means configured for destroying the storage medium components or otherwise rendering them unreadable, or otherwise erasing information on the storage medium components.

12. The data storage module of claim 11, wherein said destruction means is coupled to an actuator, said actuator being a contact responsive actuator, temperature sensor, biometric sensor, motion sensor, light sensor or sound responsive actuator.

13. The data storage module of claim 1, further comprising a user-input device disposed on said first end, said user-input device allowing for selection of, or gaining access to, one of said two or more storage medium components, and/or gaining access to said data storage module, said user-input device being a slidable switch, dial, push button, tilt sensor or toggle, or some other user contact responsive actuator, temperature sensor, biometric sensor, motion sensor, or light sensor.

14. A data storage module that is insertable into and removable out of an externally accessible bay of a computer, said module comprising
   a casing comprising a first end and a second end;
   two or more storage medium components contained at least partially within said casing, wherein said two or more storage medium components are physically separated from each other;
   a user-input device disposed on said first end, said user-input device allowing for selection of, or gaining access to, one of said two or more storage medium components, and/or gaining access to said data storage module; and
   at least one lack on at least one of either said first or second ends for communicatingly connecting said data storage module to said computer; wherein said casing and said at least one jack are sized and configured for positioning within said bay such that at least twenty percent of said data storage module, including said at least one jack, is contained within said bay when communicatingly connected to said computer.

15. The data storage module of claim 14, wherein said user-input device is a key-pad.

16. The data storage module of claim 15, wherein a storage medium component comprises a program code module that enables access to the data storage module only upon entering a predetermined code into said key-pad.

17. The data storage module of claim 15, wherein a storage medium component comprises a program code module that enables a storage medium component to be zeroized.

18. The data storage module of claim 15, further comprising firmware that comprises a program code module that enables access to the data storage module only upon entering a predetermined code into said key-pad.

19. The data storage module of claim 18, wherein said firmware comprises a program code module that enables a storage medium component to be zeroized.

20. A computer system comprising a display, a keyboard, a bay for holding a removable data storage module and a removable data storage module positioned within said bay, said removable data storage module comprising a casing comprising a first end and a second end; two or more storage medium components contained at least partially within said casing, wherein said two or more storage medium components are physically isolated from each other; and at least one jack on at least one of either said first or second ends for communicatingly connecting said data storage module to said computer; wherein said casing and said at least one jack are sized and configured for positioning within said bay such that at least twenty percent of said data storage module, including said at least one jack, is contained within said bay when communicatingly connected to said computer; wherein said data storage module comprises a first jack disposed on said first end and a second jack disposed on said second end.

21. The computer system of claim 20, wherein said at least one jack comprises a host bus adapter (HBA).

22. The computer system of claim 20, further comprising a selector device disposed on said first end for selecting one of said two or more storage medium components for usage.

23. The computer system of claim 22, wherein said selector device is a slidable switch, dial, push button, tilt sensor or toggle, or some other user contact responsive actuator, temperature sensor, biometric sensor, motion sensor, or light sensor.

24. The computer system of claim 20, wherein said two or more storage medium components comprise a first storage medium component comprising a first operating system loaded thereon and a second storage medium component comprising a second operating system loaded thereon.

25. The computer system of claim 24, wherein said first operating system and said second operating system are of a same or different type of operating system.

26. The computer system of claim 20 comprising at least three storage medium components, said three storage medium components a first storage medium component comprising a first operating system loaded thereon, a second storage medium component comprising a second operating system loaded thereon and a third storage medium component without an operating system loaded thereon, wherein said first storage medium component and said second storage medium component can communicate with said third storage medium component.

27. A computer system comprising a display, a keyboard, a bay for holding a removable data storage module and a removable data storage module positioned within said bay, said removable data storage module comprising a casing comprising a first end and a second end; two or more storage medium components contained at least partially within said casing, wherein said two or more storage medium components are physically isolated from each other; a user-input device disposed on said first end, said user-input device allowing for selection of, or gaining access to, one of said two or more storage medium components, and/or gaining access to said data storage module; and at least one jack on at least one of either said first or second ends for communicatingly connecting said data storage module to said computer; wherein said casing and said at least one jack are sized and configured for positioning within said bay such that at least twenty percent of said data storage module, including said at least one jack, is contained within said bay when communicatingly connected to said computer.

28. The computer system of claim 27, wherein said user-input device is a key-pad.

29. The computer system of claim 28, wherein a storage medium component comprises a program code module that enables access to the data storage module only upon entering a predetermined code into said key-pad.

30. The computer system of claim 28, wherein a storage medium component comprises a program code module that enables a storage medium component to be zeroized.

* * * * *